United States Patent

[11] 3,613,019

[72] Inventors Takuo Muratani
Tokyo;
Masaka Ogi, Tokyo; Takeshi Shoji, Yokohama; Etsuji Kanamori, Ohno, all of Japan

[21] Appl. No. 24,550
[22] Filed Apr. 1, 1970
[45] Patented Oct. 12, 1971
[73] Assignees Kokusai Denshin Denwa Do., Ltd. Tokyo, Japan; Fujitsu Limited Kawasaki, Japan
[32] Priority Apr. 8, 1969
[33] Japan
[31] 44-27071

[54] BURST-SIGNAL-DEMODULATING CIRCUIT ARRANGEMENT
5 Claims, 4 Drawing Figs.

[52] U.S. Cl. .......... 329/104, 325/320, 328/110, 329/50, 340/204
[51] Int. Cl. .......... H03k 9/00
[50] Field of Search .......... 329/104, 50; 328/109, 110; 325/30, 40, 320, 324; 340/204; 178/66

[56] References Cited

UNITED STATES PATENTS

| | | | |
|---|---|---|---|
| 3,030,614 | 4/1962 | Lehan et al. | 340/204 |
| 3,122,704 | 2/1964 | Jones | 329/50 X |
| 3,376,511 | 4/1968 | Brothman et al. | 325/320 |
| 3,376,514 | 4/1968 | Womack et al. | 325/320 X |

*Primary Examiner*—Alfred L. Brody
*Attorneys*—Curt M. Avery, Arthur E. Wilfond, Herbert L. Lerner and Daniel J. Tick

ABSTRACT: A connector between a delay circuit and first and second synchronizing circuits supplies the output burst signal of the delay circuit instead of the input burst signal to one of the synchronizing circuits when such synchronizing circuit establishes synchronism. The input burst signals are supplied to the delay circuit and alternately to the first and second synchronizing circuits. The delay circuit has a delay time which is at least equal to the synchronizing time of the first synchronizing circuit, which in turn is equal to the synchronizing time of the second synchronizing circuit.

BURST-SIGNAL-DEMODULATING CIRCUIT ARRANGEMENT

DESCRIPTION OF THE INVENTION

The invention relates to a burst-signal-demodulating circuit arrangement. More particularly, the invention relates to a burst-signal-demodulating circuit arrangement utilized in a PCM time division multiple-access satellite communication system or the like.

In the present disclosure a PCM time division multiple-access satellite communication system is identified as a PCM-TDMA system. A PCM-TDMA system comprises a satellite and a plurality of earth stations. At each earth station, the carrier wave is phase-modulated with the PCM signal. The modulation is known as phase shift keying is referred to in the present disclosure as PSK modulation. As a result of the PSK modulation, an electrical wave or signal is transmitted from the earth station to the satellite only during a constant period of time allotted to said earth station. A signal in the divided period of time, as hereinbefore described, is called a burst.

Bursts from each earth station are successively received by the satellite in the form illustrated in FIG. 1. The signals are frequency-converted and amplified on the satellite and the bursts are then retransmitted to the plurality of earth stations. Each earth station successively demodulates the burst from the other earth stations, selects the channel directed to each of the earth stations, and provides the communication channel. Mutual overlapping of bursts of different stations may be prevented either by synchronizing the clocks of all the earth stations or by controlling the burst emission time when a clock-asynchronous system is utilized. The control of the burst emission time is undertaken in a manner whereby a plurality of bits, called a unique word, for discriminating the station, are added to the head part of each station burst and each station controls the transmission time of the burst. Thus, the interval between the time of detection of the unique word of each of the stations and the time of detection of the unique word of a reference station may always be equal to a specified value.

The circuit arrangement of the invention is principally applicable to a PCM-PSK modulating and demodulating system in a PCM-TDMA system in which the bursts are demodulated by a synchronous detection system. The modulation system may comprise either the absolute phase modulation system wherein the information corresponds to the phase itself, or the differential phase modulation system wherein the information corresponds to the amount of phase transition. PSK-modulated waves may also be demodulated by a delay detection system, wherein the amount of the phase transition is detected by multiplication with the signal of the next-preceding bit. However, this system is theoretically inferior to the synchronous detection system in the resultant signal error rate. It may therefore be considered that the synchronous detection system is generally more advantageous for use in a satellite communication system wherein lower level signals are treated.

In order to accomplish synchronous detection, it is necessary to derive the synchronous information, that is, to regenerate the carrier wave. The bursts are supplied successively, as hereinbefore described, and the frequencies of such bursts are all different, due to the stability of the local oscillation frequencies of the transmitters, or the Doppler phenomenon resulting from the movement of the satellite. Therefore, if it is attempted to demodulate the bursts by the utilization of a single carrier-wave-regenerating device, it becomes necessary to provide a period of time for the regeneration of the carrier wave in the head part of each burst. This is called the synchronizing word. It is also necessary to utilize a high-speed carrier-wave-regenerating device in which synchronism may be rapidly established in the allotted period of time. This system has a defect or disadvantage, however. It is assumed that the fundamental period of each burst is 8 kilohertz, that is, one frame length is 125 microseconds, and, for example, there are 30 bursts in one frame and the length of the synchronous word is 0.5 microsecond, the sum total of the synchronous word lengths in one frame is 15 microseconds. This results in a decrease in communication capacity.

To eliminate the aforedescribed defect, it has been proposed to utilize two carrier-wave-regenerating circuits in alternate operation and to demodulate the modulated wave by delaying the signal for a period of time necessary to establish synchronism. This eliminates the need for a synchronous word.

The principal object of the invention is to provide a new and improved burst-signal-demodulating circuit arrangement.

An object of the invention is to provide a burst-signal-demodulating circuit arrangement which overcomes the disadvantages of known circuit arrangements of similar type.

An object of the invention is to provide a burst-signal-demodulating circuit arrangement which eliminates the need for a synchronizing word in each burst.

An object of the invention is to provide a burst-signal-demodulating circuit arrangement which is immune to the effects of temperature variations.

An object of the invention is to provide a burst-signal-demodulating circuit arrangement which eliminates undesired phase variations.

An object of the invention is to provide a burst-signal-demodulating circuit arrangement which maintains a low error rate.

An object of the invention is to provide a burst-signal-demodulating circuit arrangement which functions with efficiency, effectiveness and reliability.

In accordance with the invention, a burst-signal-demodulating circuit arrangement comprises a first synchronizing circuit having a determined synchronizing time. A second synchronizing circuit has a synchronizing time equal to that of the first synchronizing circuit. A delay circuit has a delay time at least equal to the determined synchronizing time. An input supplies input burst signals to the delay circuit and alternately to the first and second synchronizing circuits. A demodulator selectively connected to the first and second synchronizing circuits and coupled to the delay circuit demodulates the output burst signal of the delay circuit by the output of one of the synchronizing circuits. Connecting means between the delay circuit and the first and second synchronizing circuits supplies the output burst signal of the delay circuit instead of the input burst signal to the one of the synchronizing circuits when the one of the synchronizing circuits establishes synchronism.

Each of the first and second synchronizing circuits comprises a carrier-wave-regenerating circuit and a clock-regenerating circuit. The carrier-wave-regenerating circuit and the clock-regenerating circuit have a common input and different outputs.

The connecting means comprises first and second switch means. The first switch means has a switch arm fixedly connected at one end in common to the inputs of the carrier-wave-regenerating circuit and the clock-regenerating circuit of the first synchronizing circuit and movable at its other end between the input means and the output of the delay means. The second switch means has a switch arm fixedly connected at one end in common to the carrier-wave-regenerating circuit and the clock-regenerating circuit of the second synchronizing circuit and movable at the other end between the input means and the output of the delay means.

The connecting means supplies the output burst signal of the delay circuit to only one of the carrier-wave-regenerating circuits and the clock-regenerating circuit of each of the first and second synchronizing circuits instead of the input burst signal when synchronism is established in the one of the first and second synchronizing circuits.

An equalizing circuit is connected to the output of the delay circuit. The demodulating means comprises a phase detector having an input connected to the output of the equalizing circuit, another input and an output. A third switch means has a switch arm fixedly connected at one end to the other input of the phase detector and another end movable between the output of the carrier-wave-regenerating circuit of the second synchronizing circuit and the output of the carrier-wave-regenerating circuit of the first synchronizing circuit.

In order that the present invention may be readily carried into effect, it will now be described with reference to the accompanying drawings, wherein.

In the figures the same components are identified by the same reference numerals.

Figures 1, 2:
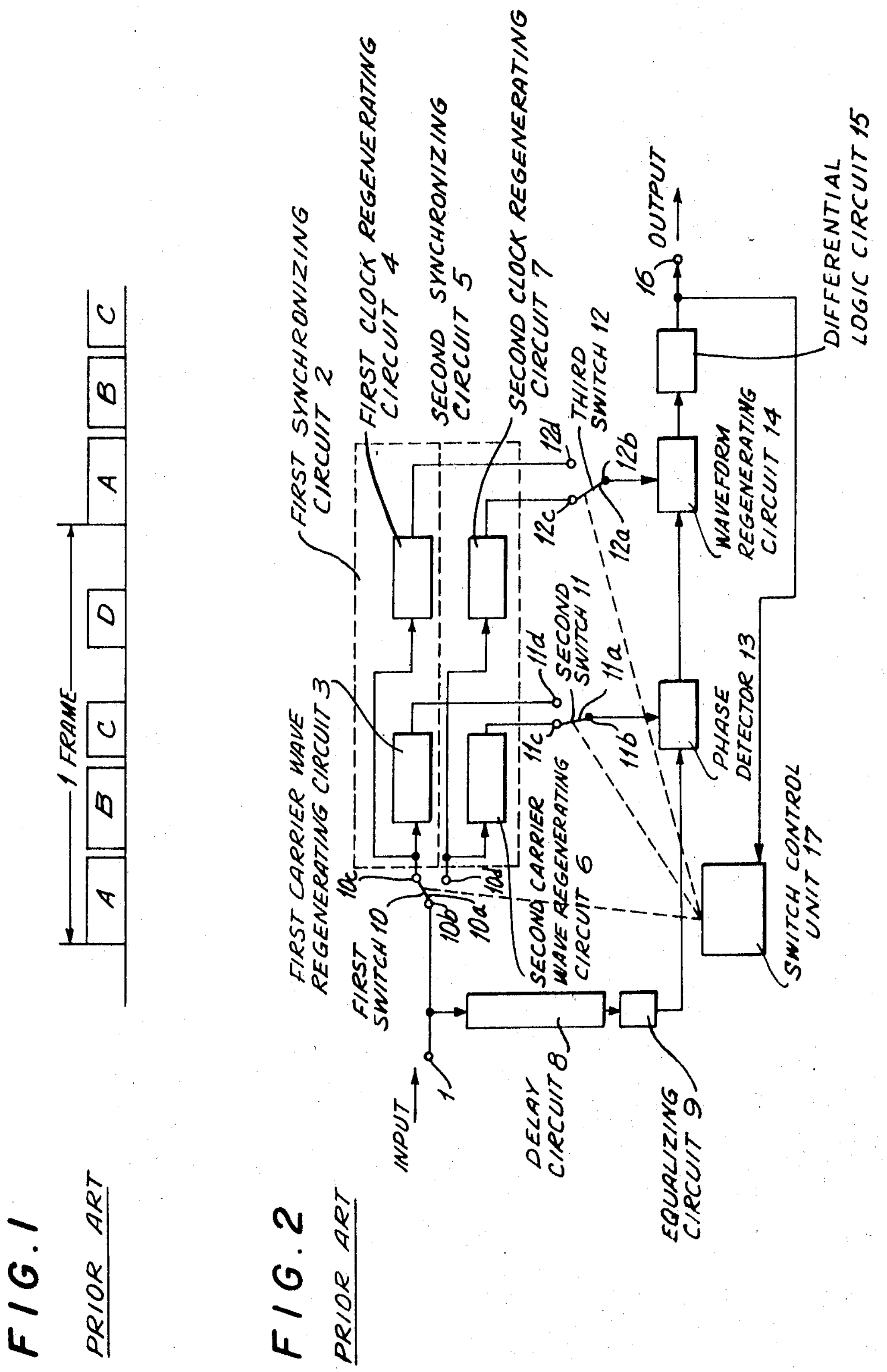
FIG. 1 is a graphical presentation illustrating a burst.
FIG. 2 is a block diagram of a burst-signal-demodulating circuit arrangement of known type.

The known circuit arrangement of FIG. 2 is a PSK-demodulating device. A phase-modulated or differential-phase-modulated wave of intermediate frequency is converted from the frequency of the microwave from the satellite and is supplied to an input terminal 1. A first synchronizing circuit 2 comprises a first carrier-wave-regenerating circuit 3 and a first clock-regenerating circuit 4. A second synchronizing circuit 5 comprises a second carrier-wave-regenerating circuit 6 and a second clock-regenerating circuit 7. Each of the first and second synchronizing circuits 2 and 5 is identical to the other, with the first and second carrier-wave-regenerating circuits 3 and 6 being identical to each other, and with the first and second clock-regenerating circuits 4 and 7 being identical to each other. A delay circuit 8 is connected to the input 1 and functions to delay the input signal by a period of time equal to that required for the synchronizing circuits 2 and 5 to establish phase synchronism.

An equalizing circuit 9 is connected to the output of the delay circuit 8 and functions to equalize amplitude distortion and phase distortion in said delay circuit. A first switch 10 has a switch arm 10*a* connected at one end to a contact 10*b* which is connected to the input 1 and movable at its other end between a contact 10*c* and a contact 10*d*. The contact 10*c* of the first switch 10 is connected to the first carrier-wave-regenerating circuit 3 and to the first clock-regenerating circuit 4 of the first synchronizing circuit 2. The contact 10*d* of the first switch 10 is connected to the second carrier-wave-regenerating circuit 6 and the second clock-regenerating circuit 7 of the second synchronizing circuit 5.

A second switch 11 has a switch arm 11*a* connected at one end to a fixed contact 11*b* and movable at the other end between a contact 11*c* and a contact 11*d*. The contact 11*c* of the second switch 11 is connected to the output of the second carrier-wave-regenerating circuit 6 and the contact 11*d* is connected to the output of the first carrier-wave-regenerating circuit 3. A third switch 12 has a switch arm 12*a* connected at one end to a fixed contact 12*b* and movable at its other end between a contact 12*c* and a contact 12*d*. The contact 12*c* of the third switch 12 is connected to the output of the second clock-regenerating circuit 7 and the contact 12*d* is connected to the output of the first clock-regenerating circuit 4.

A phase detector 13 has an input connected to the output of the equalizing circuit 9 and an input connected to the contact 11*b* of the second switch 11. The phase detector 13 demodulates the PSK-modulated wave provided by the equalizing circuit 9 by utilizing the carrier wave regenerated by the second carrier-wave-regenerating circuit 6 or by the first carrier-wave-regenerating circuit 6 or by the first carrier-wave-regenerating circuit 3, depending upon whether the switch arm 11*a* of the second switch 11 is in contact with the contact 11*c* or the contact 11*d* of said switch. A waveform-regenerating circuit 14 has an input connected to the output of the phase detector 13 and an input connected to the contact 12*b* of the third switch 12. The waveform-regenerating circuit 14 discriminates "1" or "0" of the demodulated waveform, which is noise superposed and band limited, and regenerates the waveform using the clock regenerated by the second clock-regenerating circuit 7 or by the first clock-regenerating circuit 4 in accordance with whether the switch arm 12*a* of the third switch 12 is in contact with the contact 12*c* or the contact 12*d*. A differential logical circuit 15 has an input connected to the output of the waveform-regenerating circuit 14 and has an output connected to an output terminal 16. The differential logical circuit 15 transmits the information transmitted after comparison with the next preceding bit.

In the circuit arrangement of FIG. 2, either of the first and second carrier-wave-regenerating circuits 3 and 6 and either of the first and second clock-regenerating circuits 4 and 7 may be utilized by being switched alternately by a signal indicating the commencement of the burst of each station. This signal is called the start of burst signal and is referred to in this disclosure as the SB signal. In a synchronous TDMA system, the SB signal may be readily provided for all the stations from a specific time position within a frame. In an asynchronous TDMA system, the SB signal may also be readily provided by forecasting, for example, the commencement or start time of the burst of the next frame from the unique word-detecting time of each station by utilizing a high precision timing circuit such as a counter.

In the circuit arrangement of FIG. 2, when the first burst is supplied to the input terminal 1, the first, second and third switches 10, 11 and 12 are controlled by any suitable means, such as, for example, a switch control unit 17, to their positions shown in FIG. 2. When the synchronism of the first synchronizing circuit 2 is established, the second and third switches 11 and 12 are in their positions opposite those shown in FIG. 2, so that the switch arm 11*a* is in contact with the contact 11*d* and the switch arm 12*a* is in contact with the contact 12*d*. Therefore, the burst signal provided by the delay line 8 is demodulated by the phase detector 13 and the waveform-regenerating circuit 14.

When the input burst is terminated, the first switch 10 is switched to its position opposite that shown in FIG. 2 by the switch control unit 17, so that the switch arm 10*a* is in contact with the contact 10*d*. The next succeeding burst is therefore supplied to the second synchronizing circuit 5. Even after the termination of the first burst, the first burst signal is still transmitted from the delay circuit 8 during the delay time. Therefore, during such period of time, all the switches are connected in their positions opposite those shown in FIG. 2.

Since the switches are then connected in their positions opposite those shown in FIG. 2, the first burst signal is demodulated by the synchronized signals provided by the first synchronizing circuit 2 and the next burst is supplied to the second synchronizing circuit 5 to establish the synchronism of the second burst. When the demodulation of the first burst is terminated, and the establishment of synchronism for the demodulation of the second burst is completed, the second and third switches 11 and 12 are switched back to their positions shown in FIG. 2. Thereafter, the same operation is repeated, so that the PCM-PSK bursts are demodulated.

The circuit arrangement of FIG. 2 functions effectively to eliminate the need for a synchronizing word in each burst. This is accomplished by the alternate utilization of the first and second synchronizing circuits 2 and 5. The circuit arrangement of FIG. 2 has defects or disadvantages, however. Temperature variations cause variations in the electrical length of the delay circuit 8. This results in phase variations in the output of the delay circuit 8. Furthermore, when there are deviations in the input frequencies of bursts, phase deviation occurs in the output of the delay circuit 8. This results in considerable deterioration of the error rate when a multiphase modulation system is utilized such as, for example, a four-phase or eight-phase system, even if the phase deviation at the output of the delay circuit 8 is from one to several degrees.

In a four-phase system, for example, the allowable limit of the demodulation is $\pm45°$, and in an eight-phase system, the allowable limit of the demodulation is $\pm22.5°$, however excellent the carrier-to-noise ratio may be. It is assumed that the electrical length of the delay circuit 8 is 300 meters, that is, the delay time is 1 microsecond, and deviations of the input frequencies of bursts are ±20 kilohertz, the phase deviation at the output of the delay circuit 8 is $\pm 360° \times 20 \times 10^3 \times 10^{16} = \pm 7.2°$. It may be assumed that the error rate will be greatly deteriorated.

It is also assumed that the electrical length of the delay circuit 8 is varied by 0.01 percent, that is, 3 cm., by the temperature variation, and the input frequency is 140 megahertz, the phase of the output of said delay circuit is $360° \times 140 \times 10^6 \times 33 \times 10^{10} = 5.04°$. This means that the error rate may deteriorate considerably, dependent upon the temperature stability of the delay circuit.

Figure 3:
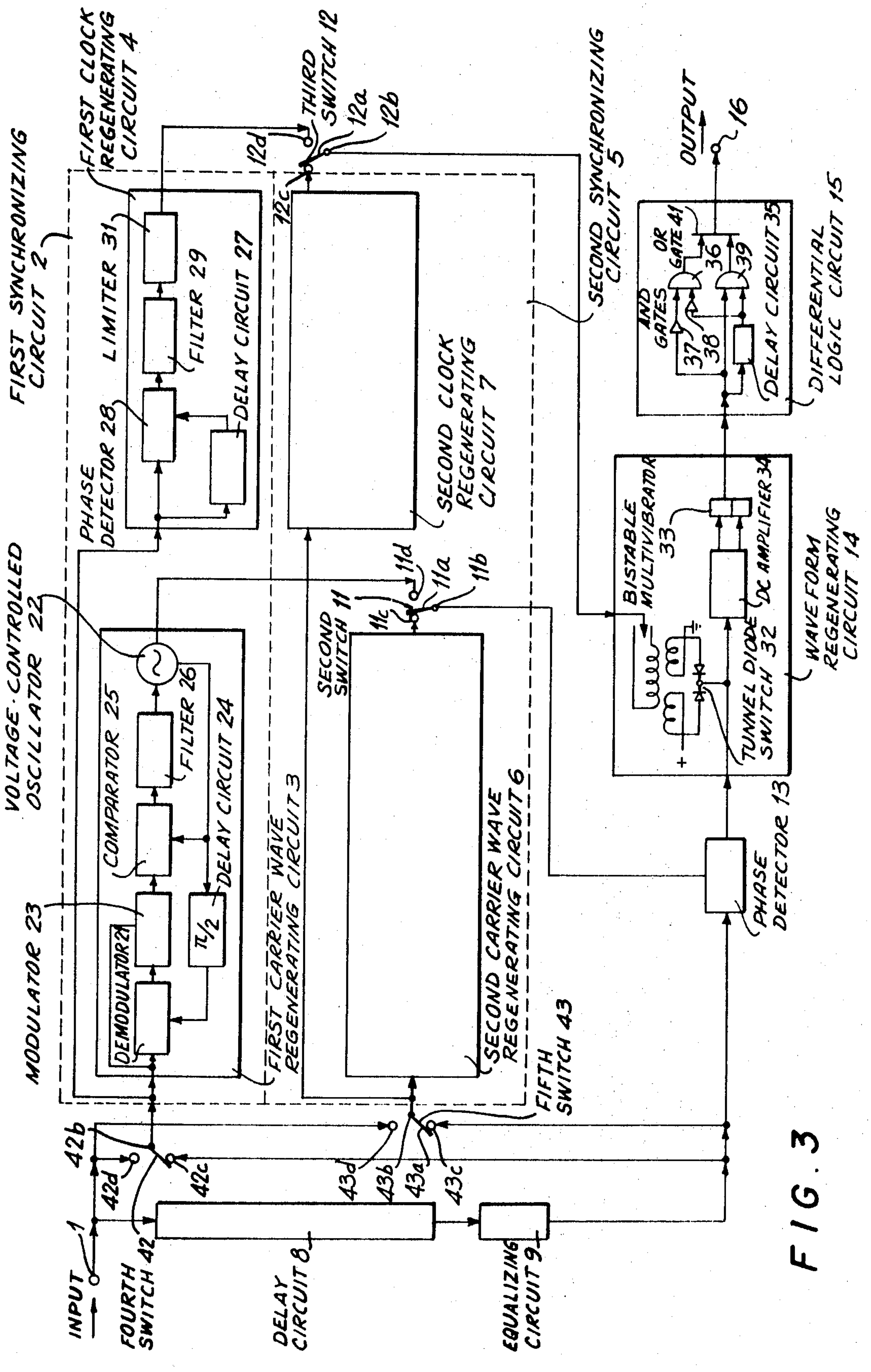
FIG. 3 is a block diagram of an embodiment of the burst-signal-demodulating circuit arrangement of the invention.

FIG. 3, which is an embodiment of the burst-signal-demodulating circuit arrangement of the invention, is essentially similar to FIG. 2. In FIG. 3, the first and second carrier-wave-regenerating circuits 3 and 6 produce the reference carrier waves utilized for the phase detection of the PSK-modulated input waves. In the embodiment of FIG. 3, as in the embodiment of FIG. 2, the first and second carrier-wave-regenerating circuits 3 and 6 are identical to each other and the first and second clock-regenerating circuits 4 and 7 are identical to each other. A suitable circuit arrangement for each of the first and second carrier-wave-regenerating circuits is shown in the first carrier-wave-regenerating circuit and a suitable circuit arrangement for each of the first and second clock-regenerating circuits is shown in the first clock-regenerating circuit. A suitable circuit arrangement is shown for the waveform-regenerating circuit 14 and a suitable circuit arrangement is shown for the differential logical circuit 15.

In FIG. 3, the first carrier-wave-regenerating circuit 3 comprises a demodulator 21 which demodulates the PSK-modulated input utilizing the output of a voltage-controlled oscillator 22, delayed by $\pi/2$ radians. The input PSK-modulated wave is remodulated by the output signal of the demodulator 21 and the unmodulated wave is derived from the output of a modulator 23 having its input connected to the output of the demodulator 21. The input of the demodulator 21 is also connected to an input of the modulator 23. The delay of $\pi/2$ radians is accomplished by a delay circuit 24 connected between an output of the voltage-controlled oscillator 22 and an input of the demodulator 21.

The output of the modulator 23 is compared with the output of the voltage-controlled oscillator 22 in a comparator 25 having an input connected to the output of said modulator and an input connected to the output of said oscillator. The output of the comparator 25 is filtered by a filter 26 and controls the voltage-controlled oscillator 22 via said filter. The phase of the voltage-controlled oscillator 22 is thus controlled so that it is exactly coincident with the phase of the input wave and the reference carrier wave may be provided. A well-known ring modulator may be utilized as the demodulator 21, the modulator 23 and the comparator 25.

The first or second carrier-wave-regenerating circuit 3 or 6 may be replaced by a circuit which is such that the PSK-modulated input waves are multiplied and then divided so that the carrier component is derived therefrom via an automatic phase control circuit which may comprise the comparator 25, the filter 26 and the voltage-controlled oscillator 22.

The first and second clock-regenerating circuits 4 and 7 regenerate the clocks utilized for discriminating or determining "1" or "0" of the demodulated signals provided by the phase detection. The first clock-regenerating circuit 4 may comprise a ½-bit delay circuit 27. The input of the delay circuit 27 is directly connected to the first carrier-wave-regenerating circuit 3. The delay circuit 27 delays the PSK-modulated input wave by about one-half bit. The phase difference between the delayed wave and the input wave is compared in a phase detector 28. One input of the phase detector 28 is connected directly to the input of the first carrier-wave-regenerating circuit and the other input to the phase detector 28 is directly connected to the output of the delay circuit 27. The comparison performed by the phase detector 28 detects the bit transition points. The clock component is then derived via a filter 29 which has an input connected to the output of the phase detector 28. The amplitude is made constant by a limiter 31 having an input connected to the output of the filter 29. The filter 29 may be replaced by an automatic phase control circuit comprising a comparator, a filter and a voltage-controlled oscillator.

In FIG. 3, the delay circuit 8 delays the input wave by a period of time equal to or slightly greater than the period of time required for the establishment of synchronism by the first or second synchronizing circuits 2 and 5. The delay circuit 8 may comprise a suitable transmission line. The equalizing circuit 9 equalizes the amplitude distortion and the phase distortion in the output signal of the delay circuit 8. The equalizing circuit 9 may comprise any suitable equalizer such as, for example, a circuit comprising inductors and capacitors.

The phase detector 13 modulates the PSK-modulated wave supplied by the equalizing circuit 9 with the reference carrier wave regenerated by the first or second carrier-wave-regenerating circuit 3 or 6. The phase detector 13 may comprise a single ring modulator when demodulating two-phase PSK-modulated waves.

The waveform-regenerating circuit 14 regenerates waveforms from the demodulated output of the phase detector 13. The polarity or sign of the signal is discriminated or determined by a sampling circuit comprising a channel diode switch 32. The channel diode switch 32 of the waveform-regenerating circuit 14 is controlled by the output of the first or second clock-regenerating circuit 4 or 7. The resultant signal is supplied to a bistable multivibrator 33 via a DC amplifier 34, in order to suitably shape the waveform.

The differential logic circuit 15 decodes the information included in the magnitude of the difference between the two successive signals. In FIG. 3, the input signal, the waveform of which is shaped by the waveform-regenerating circuit 14, is delayed one bit by a delay circuit 35 of the differential logical circuit 15. The delayed signal at the output of the delay circuit 35 and the input signal supplied to the differential logical circuit 15 are supplied to corresponding inputs of an AND gate 36 via inverters 37 and 38, respectively, and are supplied directly to corresponding inputs of an AND gate 39. The outputs of the AND gates 36 and 39 are connected to corresponding inputs of an OR gate 41. The output of the OR gate 41 of the differential logical circuit 15 is supplied to the output terminal 16.

Figure 4:
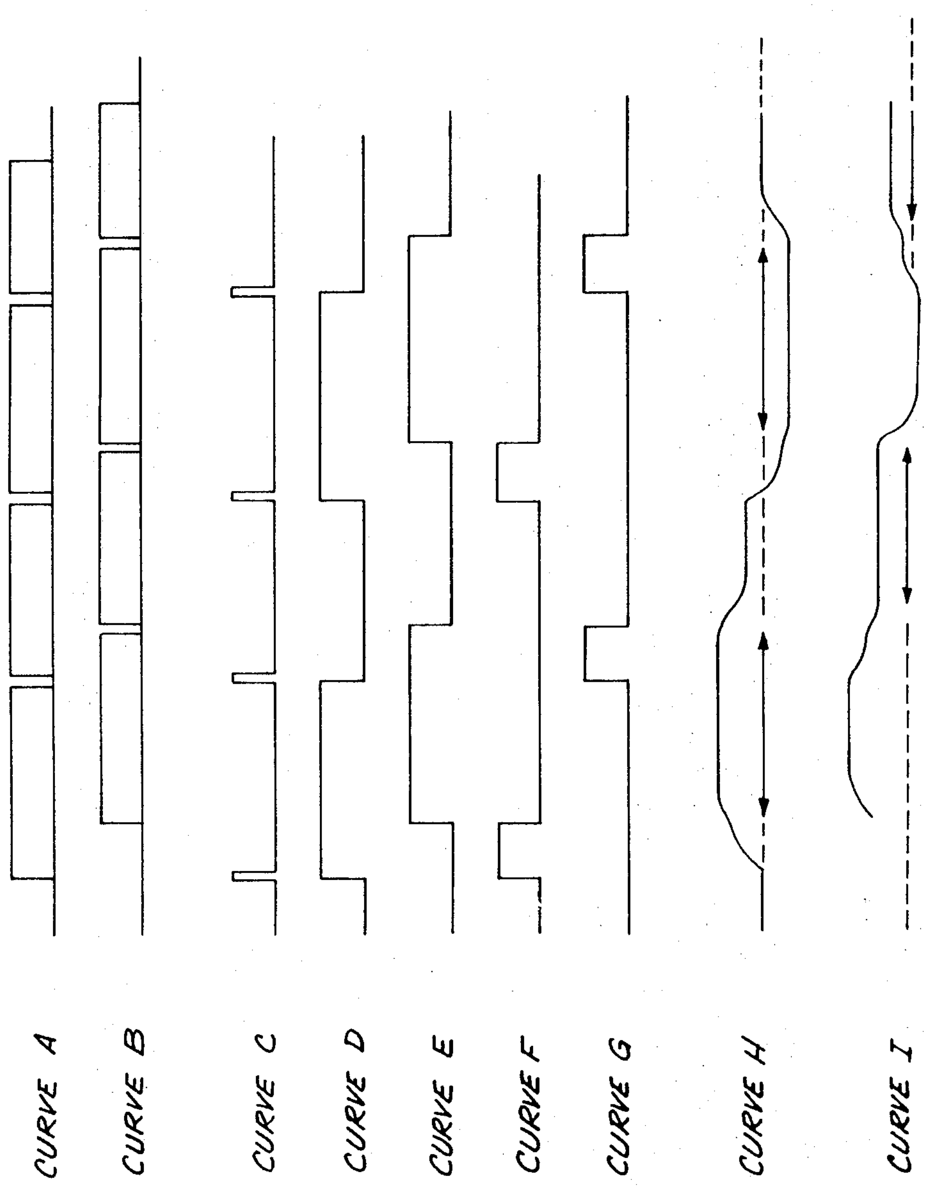
FIG. 4 is a plurality of graphical presentations illustrating the waveforms at different parts of the circuit arrangement of FIG. 3.

FIG. 4 illustrates various curves A, B, C, D, E, F, G, H and I appearing in the circuit arrangement of FIG. 3. Curve A of FIG. 4 illustrates the time relation of burst signals viewed at the input of the delay circuit 8. Curve B of FIG. 4 illustrates the time relation of burst signals viewed at the output of the equalizing circuit 9. Curve C of FIG. 4 illustrates the true relation of the SB signals provided as described with reference to FIG. 2. Curves D to I are timed charts which explain the principle of providing control signals for controlling the second and third switches 11 and 12 of FIG. 3 as well as the fourth and fifth switches thereof. The fourth and fifth switches 42 and 43 of FIG. 3 replace the first switch 10 of FIG. 2.

Curve D of FIG. 4 may be provided by operating the bistable multivibrator by the control signals of curve C. Curve E of FIG. 4 may be provided by delaying curve D of FIG. 4 by a period of time equal to the time delay of the delay circuit 8. Curves F and G of FIG. 4 may be provided by passing curves D and E through the gate circuit.

The second, third, fourth and fifth switches 11, 12, 42 and 43, of FIG. 3, are shown in said FIG. in their positions when no control pulse is supplied to them. These switches are controlled in the same suitable manner as the first, second and third switches of FIG. 2, but no switch control unit is shown in FIG. 3 in order to maintain the clarity of illustration of said FIG. The fourth switch 42 is controlled in position or condition by the signal illustrated in curve F of FIG. 4. The fifth switch 43 is controlled in position or condition by the signal illustrated in curve G of FIG. 4. The second and third switches 11 and 12 are controlled by the signal illustrated in curve E of FIG. 4. The second, third, fourth and fifth switches are operated only during the time that the pulses are supplied to them.

Curve of FIG. 4 is a time curve illustrating the principle of synchronizing operation of the first synchronizing circuit 2. Curve I of FIG. 4 is a time curve showing the principle of synchronizing operation of the second synchronizing circuit 5. As indicated by the time curves A to I of FIG. 4, simultaneously with the supply of the head of a burst at the input 1, the fourth switch 42 is operated to its position opposite to that illustrated in FIG. 3 and the synchronizing operation of the first carrier-wave-regenerating circuit 3 is initiated.

When synchronism is nearly established, and the head of the burst reaches the output of the equalizing circuit 9, the fourth switch 42 is positioned back to its position shown in FIG. 3 and synchronizing operation is performed continuously to the phase of said equalizing circuit. Simultaneously, the second and third switches 11 and 12 are switched to their positions opposite those shown in FIG. 3, so that the switch arm 11*a* contacts the contact 11*d* and the switch arm 12*a* contacts the contact 12*d*. Thus, the second and third switches 11 and 12 provide for phase detection and waveform regeneration.

The second burst is supplied to the input 1 before the demodulation of the first burst is completed. The synchronizing operation of the first and second synchronizing circuits 2 and 5 is then repeated in the aforedescribed manner to initiate the preparation for the demodulation of the second burst. Thus, after the SB signal has been provided at the correct time position, that is, after the unique word may be once detected in a synchronous TDMA system, the two synchronizing circuits 2 and 5 are alternately switched to demodulate the bursts. Upon the initiation of the demodulating operation such as, for example, the connection in the circuit of a power source, the position of the unique word may be detected utilizing an artificial SB signal. The artificial SB signal may be called a unique word search signal and is shifted in position by one bit in each frame.

Although the principle of operation of the circuit of the invention has been hereinbefore described, the characteristic features and effects of such invention are hereinafter described. It has been mentioned that no synchronizing word is required when two synchronizing circuits are utilized alternately and a delay circuit is connected before a phase detector. Our invention is based upon this principle, and the first characteristic of our invention is that the synchronizing operation is initiated simultaneously with the supply of a burst at the input of the delay circuits. After the passage of the burst through the delay circuit, and almost simultaneously with the arrival of the burst at the phase detector, the input to the synchronizing circuits is switched to the output of the delay circuit.

The second characteristic of the invention is that the synchronizing circuit utilized for the phase detection or the waveform regeneration remains to be connected to the output of the delay circuit throughout its period of use. In accordance with the invention, deterioration of the error rate due to phase deviations caused by the delay circuit is limited to the head part of the burst, and the other parts may be demodulated by the regenerated carrier wave having no phase deviation.

If it is assumed that the switching between the two regenerating circuits is performed only at the input to the delay circuit, as shown in FIG. 2, it becomes necessary to perform the detection or demodulation, or the waveform regeneration of the latter part of the burst, in the synchronous holding condition of the synchronizing circuit during a period of time equal to the delay time. In accordance with the invention, the error rate is not influenced by the synchronous holding characteristic of the synchronizing circuit, because of the second characteristic of the invention. This constitutes another considerable advantage of the invention.

Although the invention has been described with reference to a preferred embodiment, it is obvious that it is not limited to such embodiment. For example, although in this embodiment each of a pair of carrier-wave-regenerating circuits and a pair of clock-regenerating circuits is switched, it is also possible to switch only one of each pair between the input and the output of the delay circuit 8. Although a demodulator for demodulating two-phase PSK-modulated signals has been shown in FIG. 3 as the phase detector 13, the invention may also be applied to multiphase systems. Although the invention has been explained to reference to an embodiment of a PCM-TDMA system, the invention may be applied not only to such a system, but also to any burst-signal-demodulating system which requires phase snychronization.

While the invention has been described by means of a specific example and in a specific embodiment, we do not wish to be limited thereto, for obvious modifications will occur to those skilled in the art without departing from the spirit and scope of the invention.

We claim:

1. A burst-signal-demodulating circuit arrangement, comprising
- a first synchronizing circuit having a determined synchronizing time;
- a second synchronizing circuit having a synchronizing time equal to that of said first synchronizing circuit;
- a delay circuit having a delay time at least equal to the determined synchronizing time;
- input means for supplying input burst signals to said delay circuit and alternately to said first and second synchronizing circuits;
- demodulating means selectively connected to said first and second synchronizing circuits and coupled to said delay circuit for demodulating the output burst signal of said delay circuit by the output of one of said synchronizing circuits; and
- connecting means between said delay circuit and said first and second synchronizing circuits for supplying the output burst signal of said delay circuit instead of the input burst signal to said one of said synchronizing circuits when said one of said synchronizing circuits establishes synchronism.

2. A burst-signal-demodulating circuit arrangement as claimed in claim 1, wherein each of said first and second synchronizing circuits comprises a carrier-wave-regenerating circuit and a clock-regenerating circuit, said carrier-wave-regenerating circuit and said clock-regenerating circuit having a common input and different outputs.

3. A burst-signal-demodulating circuit arrangement as claimed in claim 2, wherein said connecting means comprises first and second switch means, said first switch means having a switch arm fixedly connected at one end in common to the inputs of the carrier-wave-regenerating circuit and the clock-regenerating circuit of said first synchronizing circuit and movable at its other end between said input means and the output of said delay means, and said second switch means having a switch arm fixedly connected at one end in common to the carrier-wave-regenerating circuit and the clock-regenerating circuit of said second synchronizing circuit and movable at the other end between said input means and the output of said delay means.

4. A burst-signal-demodulating circuit arrangement as claimed in claim 2, wherein said connecting means supplies the output burst signal of said delay circuit to only one of the carrier-wave-regenerating circuits and the clock-regenerating circuit of each of said first and second synchronizing circuits instead of said input burst signal when synchronism is established in said one of said first and second synchronizing circuits.

5. A burst-signal-demodulating circuit arrangement as claimed in claim 4, further comprising an equalizing circuit connected to the output of said delay circuit and third switch means, and wherein said demodulating means comprises a phase detector having an input connected to the output of the equalizing circuit, another input and an output, and said third switch means has a switch arm fixedly connected at one end to the other input of said phase detector and another end movable between the output of the carrier-wave-regenerating circuit of said second synchronizing circuit and the output of the carrier-wave-regenerating circuit of said first synchronizing circuit.